United States Patent [19]

Ciciora

[11] 4,353,263
[45] Oct. 12, 1982

[54] POWER TRANSMISSION MECHANISM
[75] Inventor: John A. Ciciora, Denver, Colo.
[73] Assignee: Nelson and Johnson, Boulder, Colo.
[21] Appl. No.: 80,741
[22] Filed: Oct. 1, 1979
[51] Int. Cl.³ .................... F16H 5/52; F16H 1/02; F16D 11/06
[52] U.S. Cl. .................... 74/337; 74/412 TA; 74/810; 74/812; 192/81 C
[58] Field of Search .......... 74/337, 810, 812, 412 TA; 192/48.91, 81 C

[56] References Cited

U.S. PATENT DOCUMENTS

| | | | |
|---|---|---|---|
| 677,872 | 7/1901 | Locke | 192/81 C |
| 850,981 | 4/1907 | Tillotson | 192/81 C |
| 1,166,379 | 12/1915 | Ludlam | 192/81 C |
| 1,436,830 | 11/1922 | Sumner | 192/81 C |
| 1,553,515 | 9/1925 | Dennison | 192/81 C |
| 1,704,062 | 3/1929 | Starkey | 192/81 C |
| 1,909,420 | 5/1933 | Palmgren | 192/48.91 |
| 2,131,469 | 9/1938 | Boecking | 74/572 |
| 2,140,975 | 12/1938 | Welch | 192/81 C |
| 2,603,324 | 7/1952 | Pepper | 192/81 C |
| 2,903,901 | 9/1959 | MacDonald | 74/810 X |
| 2,939,329 | 6/1960 | Doerries | 192/81 C |
| 2,940,563 | 6/1960 | Milenkovic et al. | 192/81 C |
| 3,008,558 | 11/1961 | Bennett et al. | 192/81 C |
| 3,028,767 | 4/1962 | Moore | 74/810 X |
| 3,110,192 | 11/1963 | Hood | 192/81 C |
| 3,528,533 | 9/1970 | Sacchini | 192/81 C |
| 3,727,732 | 4/1973 | Barr | 192/81 C |

FOREIGN PATENT DOCUMENTS

| | | | |
|---|---|---|---|
| 112158 | 3/1899 | Fed. Rep. of Germany | 192/81 C |
| 850481 | 9/1952 | Fed. Rep. of Germany | 74/810 |
| 761979 | 2/1953 | Fed. Rep. of Germany | 74/810 |
| 1199431 | 12/1959 | France | 74/812 |
| 1370853 | 7/1964 | France | 74/810 |
| 87182 | 2/1956 | Norway | 192/48.91 |

OTHER PUBLICATIONS

Product Engineering, pp. 62, 63, Aug. 18, 1958.

*Primary Examiner*—Leslie Braun
*Attorney, Agent, or Firm*—O'Rourke & Harris

[57] ABSTRACT

A novel mechanical power coupling means employable with a novel material compacting apparatus and utilizing either reciprocal or continuous drive inputs with the coupling means. In the preferred compacting apparatus embodiment a reciprocal drive is used such that the compactor is powered by both reciprocating movements of the input shaft. The compactor may be driven in a variety of speed/torque arrangements using the novel coupling means. The coupling means includes a wrapped spring clutch which automatically engages the highest speed mechanical arrangement capable of overcoming the load on the output shaft.

7 Claims, 6 Drawing Figures

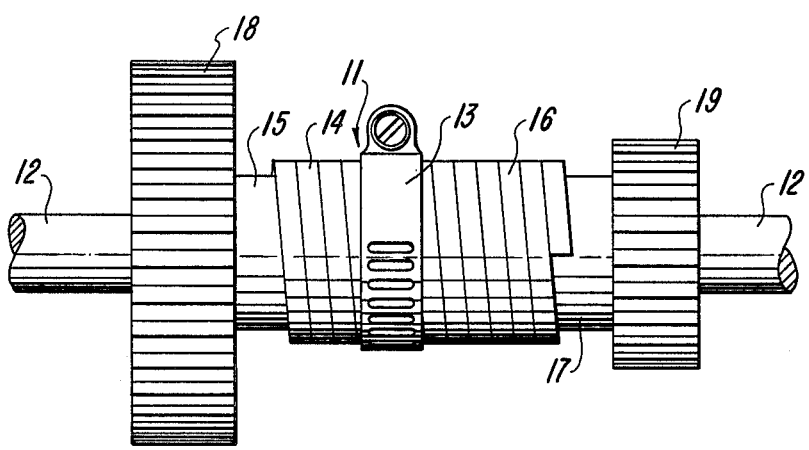
Fig_1
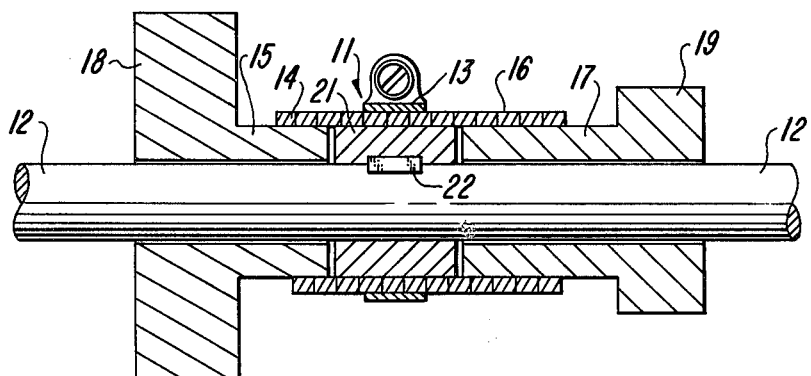
Fig_2
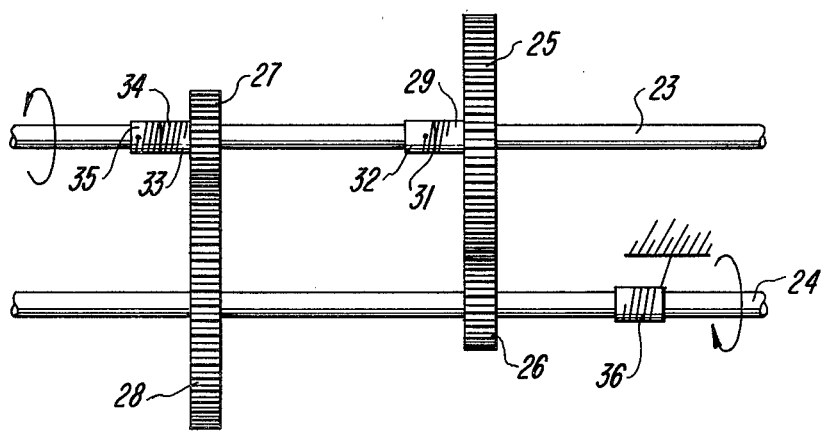
Fig_3

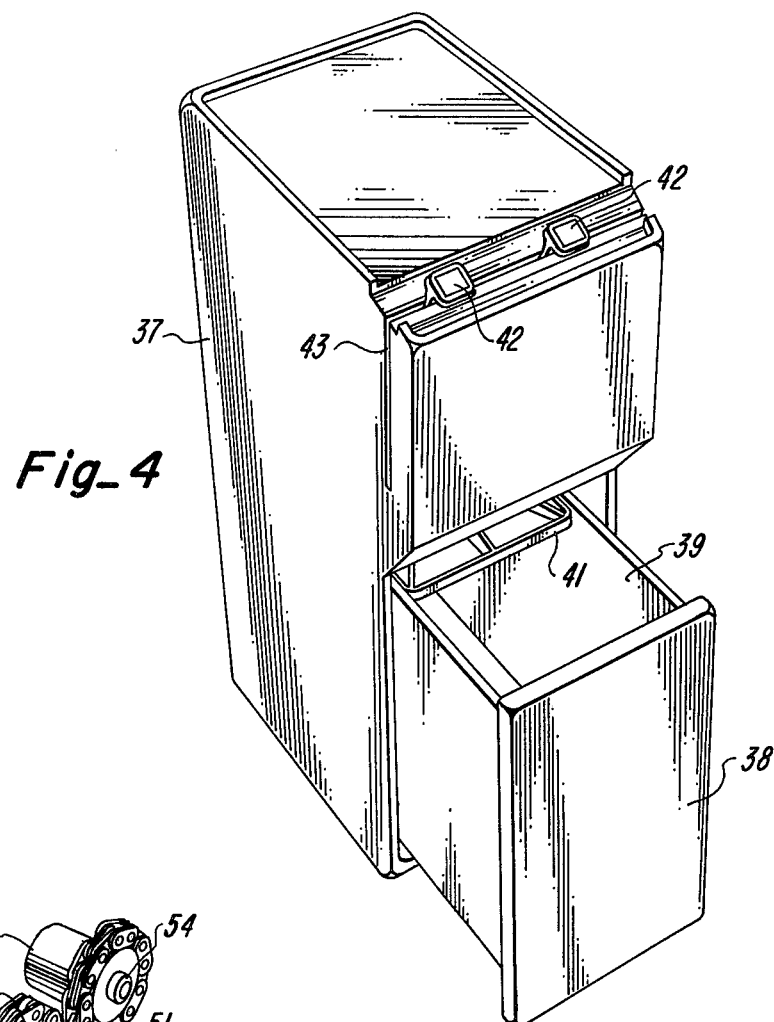
Fig_4
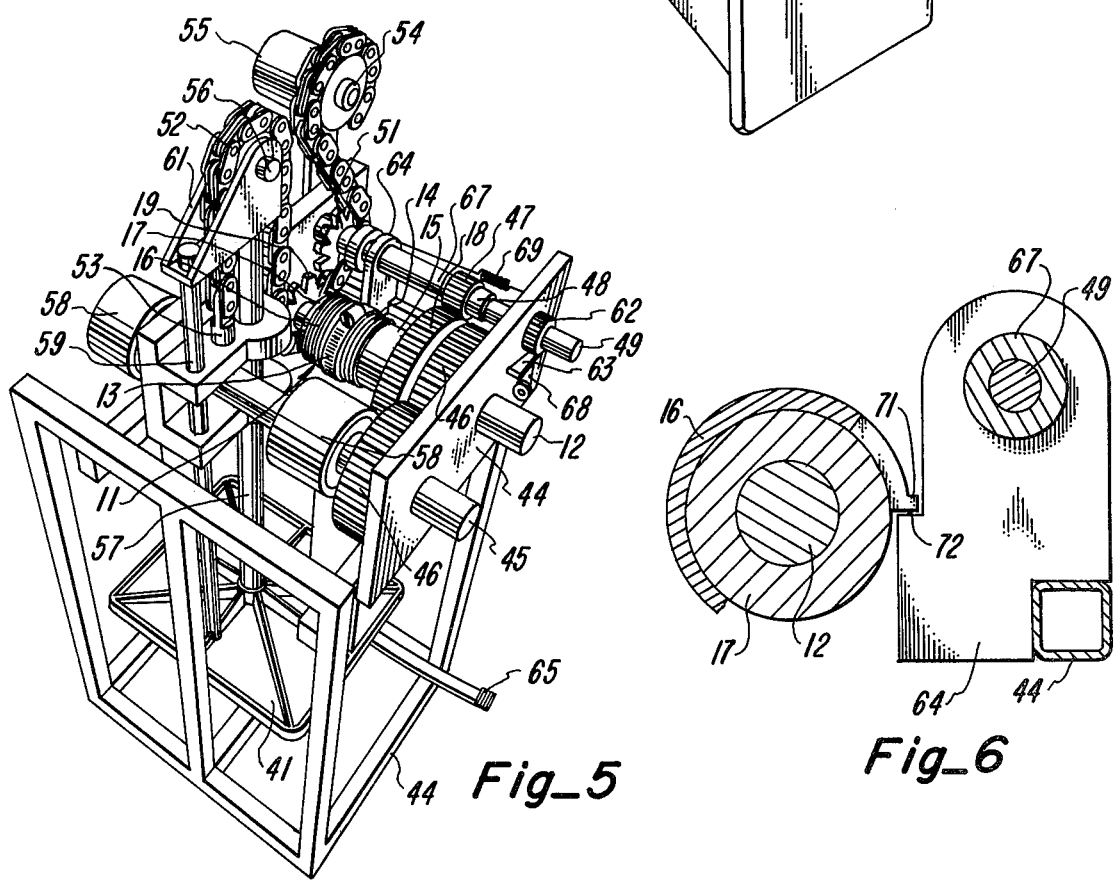
Fig_5
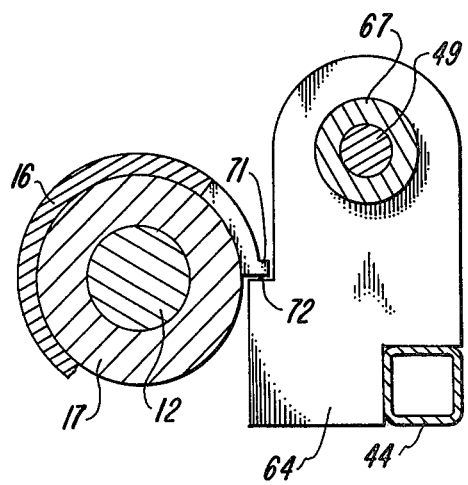
Fig_6

POWER TRANSMISSION MECHANISM

This invention relates to the field of drive systems. More particularly, this invention relates to a novel spring clutch. In still greater particularity, this invention relates to a press utilizing either continuous or reciprocal power inputs with a novel spring clutch. By way of further characterization but not by way of limitation thereto, the invention includes a material compactor utilizing a novel wrapped spring clutch allowing automatic shifting of the driving means from a high speed to a high torque mode.

BACKGROUND OF THE INVENTION

The expense and complexity of clutch and transmission arrangements have led to a restriction in their application in many devices. A simpler type of power transmitting mechanism using a spring attached on one end to a shaft and wrapped on an arbor has been employed with some success. The spring is used like a ratchet by tightening on and driving the arbor and connected gearing when rotated in one direction and loosening (overrunning) the arbor in the opposite direction. The use of this type of mechanism, while reducing complexity and expense, is limited in its applications because it is useful only when the device utilizes a single speed/torque arrangement since only one spring may be engaged with an arbor at any one time. Another limitation is that the device can drive the shaft in only one direction precluding the use of a reciprocal input. It would be desirable to have a spring clutch which could be employed with a plurality of gearing arrangements and be useful in both continuous and reciprocal drive applications.

Devices for compacting materials have many desirable uses. For example, these devices may be used for trash compaction, they may be used for extracting liquid from materials, and they may be used for baling materials such as cotton and hay. Many other uses for such devices are also possible.

The majority of the compacting devices now in use include either a rotating, screw type mechanism or a ratchet type mechanism to power a pressure plate which does the compacting. The rotating screw type devices usually require complete rotation of a handle and are generally very heavy and bulky since weight is required to provide a counter-force and avoid tipping of the unit. Alternatively, these devices may be fastened to a fixed structure.

A ratchet type device, such as that shown in U.S. Pat. No. 4,176,597, issued Dec. 4, 1979 for a manual compactor, attempts to overcome the limitations of the screw type devices by providing a counter-balancing force in the form of a second handle on the compactor. The pressure plate is driven as the handles are moved toward one another thereby balancing the forces on the unit. While suited for its intended purpose, this device drives the pressure plate only during one half of the arm rotation. The outward movement of the handles provides the required ratcheting action. Additionally only one speed/torque arrangement is used with this type of device. One reason that most prior compactors use only one speed/torque gearing arrangement is that the inclusion of clutch and transmission devices would significantly increase the cost of the compactor and make it much more complicated to manufacture and use.

If a compacting device could utilize both the forward and back strokes of the opposing handles to drive the pressure plate, then compaction may be accomplished in less time. Additionally, it would be desirable to have multiple mechanical gearing arrangements such that the pressure plate may be driven at a high speed when lower pressure to the material to be compacted is sufficient. It would be desirable to have a device which could accomplish the above and yet be relatively simple, low cost, and easy to operate.

SUMMARY OF THE INVENTION

A novel coupling means is employed with a novel material compacting apparatus. The coupling means automatically selects the highest speed mechanical arrangement which supplies the required torque. The coupling means is mounted on an input shaft and may be made responsive to the exertion of a predetermined torque upon the output shaft. The coupling means may also be made responsive to the direction of rotation of the input shaft.

The novel material compacting apparatus employs a compressing means to compact the material. A driving means is used to move the compressing means. The driving means may utilize either a continuous or a reciprocating type input. The novel coupling means allows continuous compacting with either a continuous or reciprocating drive.

When a reciprocating drive is used to power the input shaft, the coupling means includes a spring clutch arrangement which drives an output shaft while the input shaft is rotated in either direction. Two arbors are coaxially journaled on the input shaft with a spring connected to a third arbor attached to the input shaft between the journaled arbors. Spring portions on either side of the spring connection are wound on the journaled arbors. Upon shaft rotation in one direction, the first journaled arbor is engaged and upon rotation in the opposite direction, the second journaled arbor is engaged.

In the preferred embodiment of the compacting apparatus a manual reciprocating drive is used with the coupling means. The coupling means is configured as described above for a reciprocating drive. The journaled arbors are connected to the compressing means either through the output shaft or other mechanical arrangement. A high speed arrangement and a high torque arrangement are used whereby the compressing means is driven in a high speed mode when the input shaft is rotated in one direction and in a high torque mode when the input shaft is rotated in the opposite direction.

When the torque transmitting capacity of the spring on the high speed arrangement is exceeded the compressing means is driven in the high torque mode only. Upon exceeding the torque transmitting capacity of the second spring the material compaction is complete.

The novel coupling means may also be employed with a continuous drive input. In this arrangement a spring clutch is used for each mechanical arrangement between the input shaft and the output shaft. Each spring is attached to an arbor itself attached to the input shaft. The spring is then wound on an arbor journaled on the input shaft. The journaled arbor is connected to the output shaft such that the highest speed mechanical arrangement capable of overcoming the load on the output shaft is engaged.

An alternate embodiment of the material compactor uses the continuous drive input with the coupling means. The compressing means is driven in a high speed/low torque mode as long as the torque transmitting capacity of the spring on the first arbor is not exceeded. When the torque transmitting capacity of the spring on the first arbor is exceeded a second arbor is engaged and the output is driven in a low speed/high torque mode. The mechanical arrangement between each journaled arbor and the output shaft is configured such that the spring on the second journaled arbor is overrun as long as the first journaled arbor is engaged with the output shaft. Overrunning occurs when the mechanical arrangement causes the second arbor to be rotated at an angular speed greater than the input shaft upon which it is journaled. The spring cannot therefore engage the second arbor. When the torque transmitting capability of the first spring clutch exceeded the spring begins to slip on the first arbor, a condition designated as "static slip". This allows the second arbor to be engaged by its associated spring and the output shaft is driven in a high torque mode.

OBJECTS OF THE INVENTION

Accordingly, it is an object of the invention to utilize a wrapped, spring clutch with a reciprocating drive input in which both the forward and back rotations of the input shaft are used to drive a device.

It is yet another object of the invention to utilize a wrapped, spring clutch with a continuous drive input.

It is yet another object of the invention to utilize a wrapped, spring clutch with a plurality of gearing arrangements.

It is yet another object of the invention to utilize a single spring as a clutch for each pair of mechanical gearing arrangements.

It is still another object of the invention to provide a compactor in which a variety of speed/torque mechanical arrangements may be included.

It is another object of this invention to provide a compactor which may be driven by either a reciprocating or continuous drive input.

It is another object of this invention to provide a compactor in which both the forward and back strokes of the reciprocating drive input are used to power the pressure plate.

It is another object of this invention to provide a compactor in which the highest speed mechanical arrangement is automatically engaged which is capable of overcoming the load on the pressure plate.

It is still another object of the invention to provide a compactor in which a novel wrapped spring clutch is employed.

BRIEF DESCRIPTION OF THE DRAWINGS

FIG. 1 shows the novel spring clutch arrangement for use with a reciprocating drive input;

FIG. 2 shows a partial sectional view of the spring clutch arrangement of FIG. 1;

FIG. 3 shows the novel spring clutch arrangement utilized with a continuous drive input;

FIG. 4 shows an overall view of the preferred embodiment of the material compacting apparatus;

FIG. 5 is a perspective view of the apparatus with the cover and release plate removed; and FIG. 6 is a sectional view illustrating the clutch release mechanism.

DESCRIPTION OF THE PREFERRED EMBODIMENT

Referring to the various drawings wherein like structure is designated by like reference numerals throughout the various figures, FIG. 1 shows a detailed view of a spring 11 combined with a shaft 12 by a clamp 13. A first portion 14 of spring 11 is wrapped on arbor 15. A second portion 16 of spring 11 is wrapped on arbor 17. A gear 18 is attached to arbor 15 and high torque sprocket 19 is attached to arbor 17.

Referring to FIG. 2 wherein the apparatus of FIG. 1 is shown in partial sectional view, shaft 12 has arbors 15 and 17 journaled thereon. An arbor 21 is keyed to shaft 12 at 22. Gear 18 is attached to arbor 15 and sprocket 19 is attached to arbor 17. Spring 11 is clamped to arbor 21 by clamp 13. First spring portion 14 is wound on arbor 15 and second spring portion 16 is wound on arbor 17.

Referring to FIG. 3 a view of a spring clutch with a continuous drive input is shown. An input shaft 23 and an output shaft 24 are shown joined by a mechanical arrangement. The mechanical arrangement comprises a pair of high speed gears 25 and 26 and a pair of high torque gears 27 and 28. Gear 25 is attached to a first arbor 29 which is journaled on shaft 23. A spring 31 is attached to an arbor 32, itself attached to shaft 23. Spring 31 is wound on arbor 29. Gear 27 is attached to a second arbor 33 which is journaled on shaft 23. A spring 34 is attached to an arbor 35 which is attached to shaft 23. Spring 34 is wound on arbor 33. Gears 26 and 28 are attached to output shaft 24. An anti-reverse mechanism such as an anti-reverse spring clutch 36 contacts output shaft 24.

Referring to FIG. 4, a material compactor is enclosed by a case 37. A drawer 38 is mounted in case 37. Drawer 38 is opened to reveal a basket 39 and a pressure plate 41. A pair of retractable handles 42 are located near the top of case 37. A pair of slots 43 in the sides of case 37 allow handles 42 to be extended outward and away from one another.

Referring to FIG. 5, the material compactor of FIG. 4 is shown with case 37 and handles 42 removed. An input shaft 12 is mounted on a frame 44. Similarly a handle shaft 45 is mounted on frame 44. Handles 42 (shown in FIG. 4) are removably mounted on shafts 12 and 45. Handle gears 46 are connected to shafts 12 and 45. Handle gears 46 mesh between shafts 12 and 45. A gear 18 is mounted on first arbor 15 which is itself journaled on shaft 12. A high speed gear 47 is keyed on a high speed shaft 49 so as to rotate with it and yet be slidable on it. A sleeve 48 is slidably mounted on shaft 49. Gear 47 meshes with gear 18. A high speed sprocket 51 is attached to high speed shaft 49.

Referring again to FIG. 5, an engaging means which may be a spring 11 is attached to shaft 12 by a clamp 13. A first portion 14 of spring 11 is wrapped on arbor 15. A second portion 16 of spring 11 is wrapped on a second arbor 17. Arbor 17 is journaled on shaft 12. Shaft 12, arbor 15, arbor 17 and spring 11 comprise a coupling means. A high torque sprocket 19 is connected to arbor 17. A chain 52 is wound on sprockets 19 and 51. One end of chain 52 is connected to frame 44 at 53. The other end of chain 52 is wound on a chain take-up sprocket 54. A chain takeup spring 55 is connected to chain takeup sprocket 54. Chain 52 is also wound on a sprocket 56 attached to a ram shaft 57. A pair of return springs 58 are attached to shaft 45 and to pressure plate 41. A guide rod 59 is attached to pressure plate 41 at one end and to a mount 61 at the other end. Mount 61 is attached to ram shaft 57. Guide rod 59 is free to slide in frame 44.

Referring to FIG. 5, a clutch release mechanism is mounted on frame 44 and includes a ratchet 62 and a pawl 63 adjacent shaft 49. A clutch release plate 64 is attached to sleeve 67. Sleeve 67 is slidably mounted on shaft 49. A release pedal 65 is mounted on frame 44. A first cable (not shown) is connected to sleeve 48 and release pedal 65 through a conventional pulley system (not shown). A second cable 68 is connected to pawl 63. Cable 68 is also connected to release pedal 65 through a conventional pulley system (not shown). A spring 69 is connected at one end to frame 44 and at the other end to release plate 64.

Referring to FIG. 6, a sectional view of shafts 12 and 49 illustrates the operation of clutch release plate 64. Clutch release plate 64 is mounted on sleeve 67. Sleeve 67 is slidably mounted on shaft 49. Second portion 16 of spring 11 is shown wound on arbor 17 with an end 71 contacting a notch 72 in clutch release plate 64. Clutch release plate 64 contacts frame 44.

MODE OF OPERATION

Referring to FIGS. 1 and 2, a novel spring clutch is shown as configured for a reciprocating drive input. If shaft 12 is rotated clockwise when viewed from the left then arbor 21, clamp 13 and spring 11 will also rotate clockwise. Clockwise rotation causes first spring portion 14 to tighten on arbor 15. Arbor 15 is then rotated clockwise causing gear 18 to be rotated clockwise. The clockwise rotation of spring 11 results in second spring portion 16 unwinding or overrunning second arbor 17 thereby allowing second arbor 17 to float freely on shaft 12.

After shaft 12 is rotated clockwise as far as desired or allowed then shaft 12 may be rotated counterclockwise. Counterclockwise rotation of shaft 12 results in second portion 16 of spring 11 tightening on arbor 17 with first portion 14 of spring 11 overrunning arbor 15. Sprocket 19 is thus rotated counterclockwise while gear 18 on arbor 15 floats freely on shaft 12. Gear 18 and sprocket 19 may be interchanged and gears or sprockets only may be used for both mechanical arrangements without departing from the scope of the invention. Of course, more than two mechanical associations may be used and any combination of gears and sprockets or other transmission components including chains, pulleys, etc., may be employed without departing from the scope of the invention. Additionally, while the preferred embodiment utilizes spring 11 attached to shaft 12 by clamp 13 and wound on arbors 15 and 17, it should be expressly understood that the spring could be associated with the shaft by other means such as pins. Alternatively, the spring could be connected to the arbors and wound on the shaft as, for example, if two separate and distinct springs were used. These modifications may be made without departing from the scope of the invention.

In the spring clutch embodiment as shown in FIGS. 1 and 2, second spring portion 16 has more coils engaged on arbor 17 than does first spring portion 14 on arbor 15. The number of coils engaged on each arbor is predetermined in combination with the torque transmitting capabilities of the spring. The number of coils engaged on each arbor, the degree of interference between the arbors and the spring, the diameter of the spring clutch, and the coefficient of friction between the spring coils and the arbor determine these torque transmitting capabilities. When torque transmitting capability is exceeded the condition designated as "static slip" is encountered. "Static slip" results in the spring slipping on the arbor without actually turning the arbor.

Referring to FIG. 3, a novel spring clutch is shown employed with a continuous drive input. If input shaft 23 is rotated counterclockwise when viewed from the left, then springs 31 and 34 tighten on arbors 29 and 33, respectively. Gears 25 and 27 will thus be rotated counterclockwise. Because of the gear ratio of gear 25 to gear 26 output shaft 24 is rotated at a higher angular speed than is input shaft 23. That is, gear 25 turns counterclockwise causing gear 26 to turn clockwise at a greater rate of speed. Gear 28 is also turned clockwise thereby turning gear 27 and arbor 33 in a counterclockwise direction. Gear 28 is larger than gear 27 resulting in gear 27 rotating at a speed greater than shaft 24 and much greater than shaft 23. Because gear 27 and arbor 33 attached thereto are rotated at a much higher speed than shaft 23, spring 34 is overrun.

Output shaft 24 is driven in the high speed mode by the interaction of gears 25 and 26. Shaft 24 is driven at high speed until the load on shaft 24 exceeds the torque transmitting capabilities of spring 31. At this point spring 31 static slips on arbor 29. Gear 27 is therefore no longer rotated by gear 28. Spring 34 is therefore able to grip arbor 33 and gear 27 is rotated at the same speed as input shaft 23. The gear ratio of gear 27 to gear 28 is less than one and thus output shaft 24 is driven in the high torque mode. This is true until the torque transmitting capability of spring 34 is exceeded by the load on shaft 24. At that time spring 34 static slips on arbor 33 and output shaft 24 is at rest. Of course, more than two sets of gears or other transmission components such as chains and sprockets, pulleys, etc. could be used without departing from the scope of the invention. This would allow a more gradual step up in torque. As with the reciprocating input clutch configuration, the springs could be attached to the journaled arbors and wound on the fixed arbors or shaft without departing from the scope of the invention.

It is recognized that a start up threshold exists. That is, during the first instant when input shaft 23 is rotated, both arbors 29 and 33 are engaged until the gearing ratio causes spring 34 to be overrun. The strain thus put on the apparatus may be compensated for by utilizing sufficient gear tooth size to withstand this strain. The problem may thus be dealt with within standard engineering design parameters.

Referring to FIG. 4, the material compacting apparatus may be utilized as hereinafter described. Basket 39 is removed from drawer 38 and the material to be compacted is placed in basket 39. Basket 39 is then returned to its original position in drawer 38.

Drawer 38 is then closed. Handles 42 are extended upward and gripped by the user. Handles 42 may be reciprocated by the user. Slots 43 in case 37 allow handles 42 to be pulled apart as far as desired.

Referring to FIG. 5, upon movement of the handles, shafts 12 and 45 are rotated. Handles 42 can be either moved toward one another or away from one another. It has been found that an operator can exert more power when pushing the handles together then when pulling them apart. The apparatus has been designed with that fact in mind. If for any reason, more power could be generated by a user in pulling the handles apart, then the apparatus could be modified to accomodate that contingency. Two handles are used on the apparatus because they allow for easier movement of the handles as opposed to exerting a force on only one handle if only one handle was provided.

Assuming that the operator initially pulls the handles apart, then, if viewed from the front, shaft 12 will be rotated clockwise and shaft 45 will be rotated counterclockwise. Referring to FIGS. 2 and 5, the rotation of shaft 12 in a clockwise manner causes spring 11 attached to arbor 21 by clamp 13, to rotate in a clockwise manner. Referring to FIG. 1, the clockwise rotation of spring 11 causes first spring portion 14 to tighten on arbor 15. Arbor 15 is thus rotated clockwise causing gear 18 to be rotated clockwise. The clockwise rotation of spring 11 results in second spring portion 16 unwinding or overrunning second arbor 17 thereby allowing second arbor 17 to float freely on shaft 12.

Referring to FIG. 5, gear 18 meshes with gear 47 which is keyed on high speed shaft 49. Gear 18 is larger in diameter than gear 47 and thus gear 47 turns faster than gear 18, the increase in speed depending upon their gear ratio. In the preferred embodiment a 3 to 1 gear ratio of gear 18 to gear 47 is used. The meshing of gears 18 and 47 rotates shaft 49 and high speed sprocket 51 in a counterclockwise direction three times faster than shaft 12. High speed sprocket 51, attached to shaft 49, engages chain 52 and feeds it to chain take-up sprocket 54 which is biased by chain take-up spring 55 to wind chain 52 in a clockwise direction.

The taking up of chain 52 by sprocket 54 in combination with the attachment of chain 52 to frame 44 at 53 exerts a downward force on ram shaft 57 at sprocket 56. The apparatus is configured such that a two to one mechanical advantage exists between chain 52 and ram shaft 57. Pressure plate 41, attached to ram shaft 57, is also moved downward. Pressure plate 41 is configured to fit inside basket 39. Chain 52 is taken up at high speed by sprocket 51 causing pressure plate 41 to move at high speed. The downward movement of pressure plate 41 thus compresses the material contained in basket 39.

Once handles 42 have been pulled apart as far as desired or allowed by the limits of the user or apparatus, then handles 42 are pulled toward each other. This motion causes shaft 12 to be rotated counterclockwise. Referring to FIG. 1, the counterclockwise rotation of shaft 12 causes second spring portion 16 to tighten on arbor 17 thereby rotating high torque sprocket 19 in a counterclockwise direction. The countclockwise rotation of spring 11 causes first spring portion 14 to loosen or overrun on arbor 15 such that gear 18 is not rotated. Referring to FIG. 5, sprocket 19 is rotated on a one to one ratio with shaft 12 resulting in a high torque, low speed movement for pressure plate 41. The mechanics of the movement of pressure plate 41 by taking up of chain 52 are the same as that described above for the high speed movement. When the handles have been moved toward each other as far as they will go they may be pulled apart resulting in high speed movement of pressure plate 41 as described above. The handles may be reciprocated apart or together until the material is satisfactorily compacted or until the torque limits of the apparatus have been obtained.

Referring to FIG. 5, when pressure plate 41 has been moved downward such that the material has been partially compacted an upward force is exerted on pressure plate 41. A higher torque is now required to move pressure plate 41 any farther. First portion 14 of spring 11 is designed to "static slip" at this point such that arbor 15 is not rotated when shaft 12 is rotated clockwise. Pressure plate 41 is thus driven only in a high torque mode as shaft 12 is rotated counterclockwise. Thus only the movement of the handles together results in a high torque mode driving the pressure plate. The movement of the handles apart results in static slip of first portion 14 on arbor 15 when the torque transmitting capability of spring portion 14 is exceeded. When the predetermined limits of the apparatus have been reached then second portion 16 static slips on arbor 17 and the material is compacted as much as possible. The apparatus may be designed with regard to spring size, gear size and the like to accomodate a desired maximum pressure. A pressure of 6000 to 8000 psi may be readily achieved. The amount of pressure selected and the engineering design of the apparatus may be varied without departing from the scope of the invention.

It may be discerned from the above discussion that handles 42, shaft 45 and gears 46 comprise a reciprocating driving means. Similarly, gears 18 and 47, shaft 49, sprockets 19 and 51, chain 52, sprocket 56, ram shaft 51 and pressure plate 41 comprise a compressing means. Shaft 12 in conjunction with spring 11, clamp 13 and arbors 15, 17 and 21 couple the driving means to the compressing means depending upon the direction of rotation of shaft 12 and the load on pressure plate 41. The apparatus is provided with an antireverse mechanism including ratchet 62 and pawl 63. When engaged, this device prevents shaft 49 from rotating clockwise, thereby preventing pressure plate 41 from being forced upward by either the compacted material or return springs 58. The apparatus is designed such that pawl 63 may be disengaged from ratchet 62 when the material is compacted to the desired extent or to the limits of the apparatus. In FIG. 5, ratchet 62 and pawl 63 are shown located on the front of the device. This is done for purposes of illustration only. In the operating model, ratchet 62 and pawl 63 are actually located at the rear of shaft 49 behind sprocket 51. Pawl 63 is connected to release pedal 65 by cable 68 and a conventional cable and pulley system. Pawl 63 may be disengaged from ratchet 62 by depressing release pedal 65. Pawl 63 is spring biased into engagement with ratchet 62.

Referring again to FIG. 5, the depressing of release pedal 65 also serves to move sleeve 48 on shaft 49. That is, sleeve 48 is connected to release pedal 65 through a conventional cable and pulley system mounted on frame 44. Sleeve 48 slides rearward disengaging gears 18 and 47 since gear 47 is keyed to slide on shaft 49. High speed sprocket 51 may now turn freely. Clutch release plate 64, attached to sleeve 67 is pushed rearward by sleeve 48 and gear 47.

Referring to FIG. 6, the rearward movement of release plate 64 places release plate 64 in juxtaposition with second spring portion 16. Specifically, notch 72 in plate 64 is positioned directly below end 71 of second spring portion 16. Handles 42 are now pulled apart by the user resulting in a clockwise rotation of shaft 12 and second spring portion 16. End 71 thus contacts notch 72.

Referring to FIG. 5, the effect of the above is that second spring portion 16 is loosened on arbor 17 similar to an overrunning condition. Arbor 17 and sprocket 19 are thus allowed to turn freely on shaft 12. If arbor 17 and sprocket 19 were not free to turn on shaft 12 then their clockwise movement as chain 52 was taken up on sprocket 54 would cause second spring portion 16 to tighten on arbor 17 thereby preventing the release of pressure plate 41.

Because sprockets 19 and 51 are free to turn independently of any input, the exertion of a force by return springs 58 is sufficient to overcome the force exerted by chain take-up spring 55 and frictional forces. The result is the lifting of pressure plate 41 and the unwinding of chain 52 from chain take-up sprocket 54. When pressure plate 41 has been raised to its upper limit it will stop. Handles 42 may then be returned to their original position thereby allowing second spring portion 16 to again grip arbor 17.

Release pedal 65 is now allowed to return to its normal position. That is, when pressure on release pedal 65 is removed then spring 69 pulls release plate 64, sleeve 67, gear 47 and sleeve 48 forward. A second spring (not shown) may be located inside sleeve 67 between gear 47 and release plate 64. This spring is attached to shaft 49 and aids in returning sleeve 67 to its forward position. Pawl 63 is also spring biased such that it returns to its original position and engages ratchet 63. Release pedal 65 is thus lifted through the conventional cable and pulley system. During the compacting and releasing process guide rod 59 prevents pressure plate 41 from rotating thereby keeping plate 41 in alignment with the rest of the apparatus. After pressure plate 41 has been returned to its original upper position then, referring to FIG. 4, drawer 38 may be opened and basket 39 may be removed. The compacted material is removed from basket 39 and the apparatus is again ready for use.

The preferred embodiment described above utilizes a manual reciprocating input. A mechanized reciprocating input could also be used. Alternatively a continuous drive input such as that shown and described in FIG. 3, either mechanized or manual, could be used without departing from the scope of the invention.

It should be recognized that, while the spring clutch is utilized herein to allow a step up in torque, it is equally applicable in devices where a step up in speed is desired. In this application, the highest available gear ratio is selected to allow the greatest speed. As an example, referring to FIG. 3 a large load on output shaft 24 causes spring 31 to static slip thereby allowing spring 34 to engage arbor 33 and drive output shaft 24 in a high torque mode. When the load on shaft 24 is reduced sufficiently spring 31 will grip arbor 29 rotating shaft 24 at high speed and causing spring 34 to overrun as described above. The highest available gear speed ratio which can overcome the output shaft load is thus automatically engaged. The spring clutch may thus be used in devices where a large initial torque is required to turn the output shaft, the high torque requirement then giving way to higher speed requirements. For example, it would be possible to employ the spring clutch device with a vehicle transmission.

While particular forms of the invention have been described with respect to a particular embodiment thereof, it is not to be so limited as changes and modifications may be made therein which are within the full intended scope of the invention as defined by the appended claims.

The foregoing description, taken together with the appended claim consitutes a disclosure which enables a person skilled in the mechanical arts and having the benefit of the teachings contained therein to make and use the invention. Further, the structure herein described constitutes a meritorious advance in the art which is unobvious to such skilled workers not having the benefit of these teachings.

What is claimed is:

1. A spring clutch selective drive mechanism for selectively transmitting motion and torque from at least one input shaft to at least one mechanically linked output shaft through a plurality of spring clutches, the drive mechanism comprising:
a first input shaft journaled for rotation;
a plurality of arbors rotatably mounted upon the input shaft;
an individual clutch spring adapted to release in one direction of rotation and to grip in the other direction of rotation operably connected to each arbor at one end thereof and operably connected to the first input shaft at the other end thereof, the spring clutch spring being secured against slippage at one of the arbor and input shaft and wound around the other to slip in the grip direction of rotation upon a torque overload, each of the clutch springs being arranged to grip upon a common direction of rotation of the input shaft and to release during the opposite direction of rotation of the input shaft;
a rotatable output shaft spaced from the input shaft; and
drive linkage means connecting each arbor to the output shaft, each drive linkage means having a different mechanical advantage than at least one other such that the output shaft will be driven through the arbor associated with the lowest mechanical advantage drive linkage means until such time as such spring clutch associated therewith slips in the grip mode, whereupon an arbor with the next highest mechanical advantage drive linkage means will be engaged through the associated spring clutch to drive the output shaft.

2. A spring clutch drive mechanism as set forth in claim 1 in which first and second arbors are positioned on the first input shaft in an opposed manner and are engaged by a single spring functioning as two independent spring clutches with the spring being attached to the first input shaft at a central portion of the spring and with each of the end portions of the spring driving one of the arbors in the grip mode as a function of the resistance through the drive linkage means associated with the arbor, whereby upon light loads on the output shaft, the arbor connected to the drive linkage means having the lower mechanical advantage will be rotated with the first input shaft by the spring clutch, while upon reaching greater requirements, the arbor driving through the greater mechanical advantage drive linkage means will be rotated with the first input shaft.

3. A spring clutch drive mechanism as set forth in claim 1 in which the spring clutches are wound upon first and second arbors and the first and second arbors are engaged by differing numbers of coils of the associated spring clutches to provide differing engagement forces between each of the spring clutches and associated arbor.

4. A spring clutch drive mechanism as set forth in claim 1 in which a plurality of arbors are journaled relative to the first input shaft with each arbor being engaged by a spring clutch attached at one end to the input shaft and wound around the arbor in the same direction relative to rotation of the arbor as are the other arbors engaged with the spring clutches.

5. A spring clutch selective drive mechanism for transmitting differing motion and torque from an input shaft to a mechanically linked output shaft in response to the load applied to the output shaft, the mechanism comprising:
an input shaft mounted for rotation;

at least two arbors mounted upon the input shaft for rotation there around;

an individual spring clutch wound around each arbor at one end thereof and wound concentric to and operably connected to the input shaft at the other end of the spring clutch, the spring clutches being wound around the arbor to grip in the same direction relative to rotation of the input shaft;

a rotatable output shaft positioned adjacent to but spaced from the input shaft; and drive linkages connecting each of the arbors to the output shaft, each of the drive linkages having a different mechanical advantage than the other drive linkage, whereby the drive linkage having the lower mechanical advantage will be driven by the associated arbor until the load upon the output shaft causes the associated spring clutch to slip in the grip mode, whereupon the drive linkage having the greater mechanical advantage will function to drive the output shaft from the input shaft.

6. A spring clutch drive mechanism as set forth in claim 5 in which each arbor has an independent spring wound thereon to function as a spring clutch.

7. A spring clutch drive mechanism as set forth in claim 5 in which at least two arbors are positioned in opposed positions with the portions thereof adapted to receive the spring clutch facing one another, and in which the spring clutch mechanisms comprise a single spring wound in part upon each arbor, the single spring being attached to the input shaft at a position between the arbors.

* * * * *